Oct. 27, 1964  E. O. SCHWEITZER, JR  3,154,735
SYSTEM FOR MEASURING PHASE AND POWER FACTORS IN ELECTRIC
CIRCUITS INCLUDING HARMONIC PRODUCING MEANS
Filed Oct. 21, 1960
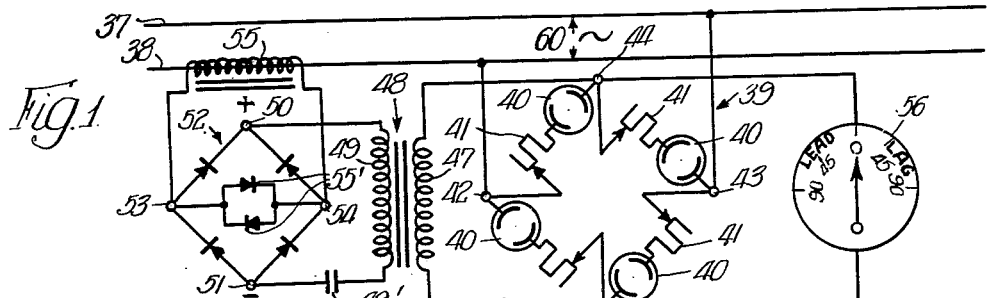
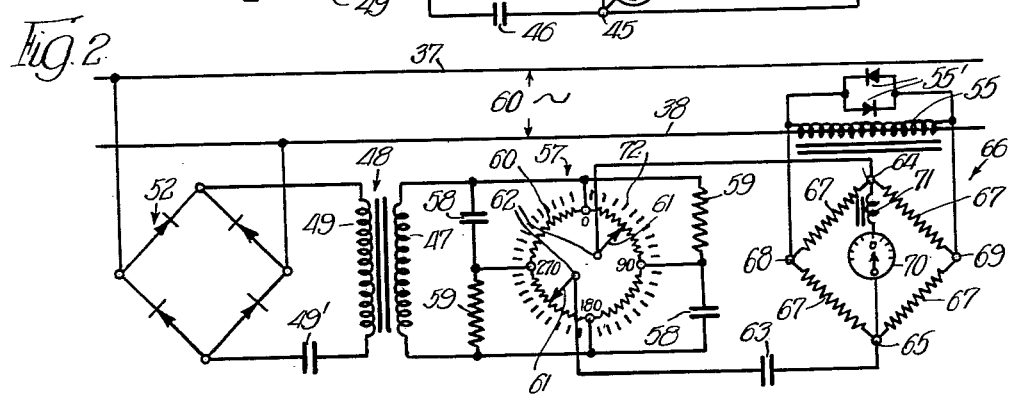
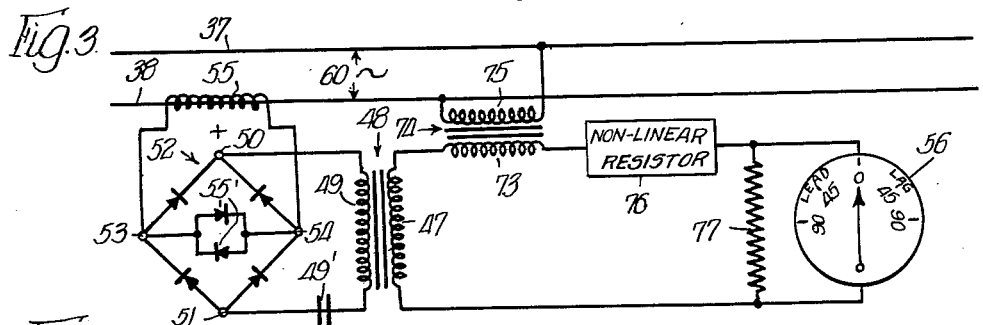
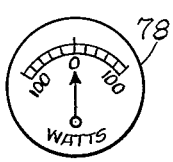
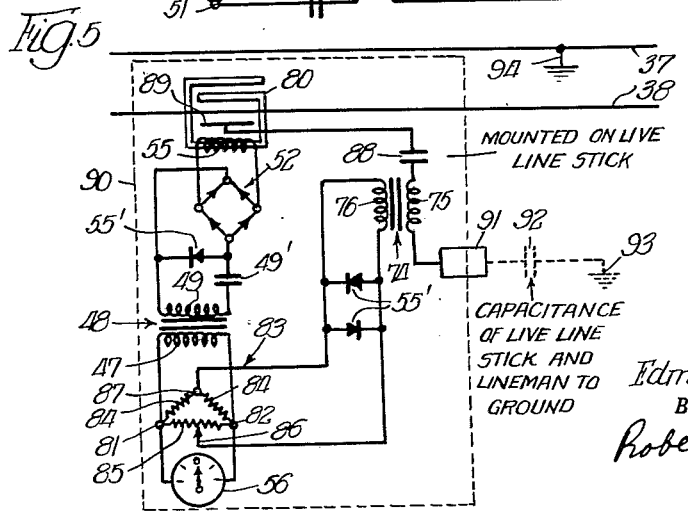
INVENTOR.
Edmund O. Schweitzer, Jr.,
BY
Robert R Lockwood

United States Patent Office 3,154,735
Patented Oct. 27, 1964

1

3,154,735
SYSTEM FOR MEASURING PHASE AND POWER FACTORS IN ELECTRIC CIRCUITS INCLUDING HARMONIC PRODUCING MEANS
Edmund O. Schweitzer, Jr., 1002 Dundee Road, Northbrook, Ill.
Filed Oct. 21, 1960, Ser. No. 64,028
17 Claims. (Cl. 324—87)

This invention relates, generally, to measuring systems and it has particular relation to such systems for use in making measurements in an alternating current circuit. This application is a continuation-in-part of application Serial No. 576,564, filed April 6, 1956, now Patent No. 3,004,381, issued October 17, 1961, of application Serial No. 594,322, filed June 27, 1956, and of application Serial No. 708,187, filed January 10, 1958, now Patent No. 3,005,134, issued October 17, 1961.

Among the objects of this invention are: To provide for making measurements in an alternating current circuit in a new and improved manner; to employ the current flowing in and the voltage across an alternating current circuit in a new and improved manner for measuring a quantity which is dependent on these variables; to derive from one of these variables an alternating current having a frequency that is twice the frequency of the alternating current circuit and to combine these two frequencies through non-linear resistance means to produce a unidirectional quantity the magnitude and direction of which show the relationship of the current and voltage of the alternating current circuit; to employ the unidirectional quantity to indicate the power factor of the circuit; and to employ the unidirectional quantity to indicate the power flowing in the circuit.

Other objects of this invention will, in part, be obvious and in part appear hereinafter.

This invention is disclosed in the embodiments thereof shown in the accompanying drawing and it comprises the features of construction, combination of elements and arrangement of parts that will be exemplified in the constructions and circuit arrangements hereinafter set forth and the scope of the application of which will be indicated in the appended claims.

For a more complete understanding of the nature and scope of this invention reference can be had to the following detailed description, taken together with the accompanying drawing, in which:

FIG. 1 illustrates, diagrammatically, one embodiment of this invention.

FIG. 2 illustrates another embodiment of the invention employing current and voltage connections which are the reverse of those employed in FIG. 1.

FIG. 3 illustrates, diagrammatically, how the fundamental frequency of the circuit derived from the voltage across it can be combined with the doubled frequency which is a function of the current flow through a non-linear resistor for obtaining an indication of power factor of the circuit.

FIG. 4 shows how the indicating instrument illustrated in FIGS. 1 and 3 can be calibrated in watts to indicate the measurement of power flow in the circuit.

FIG. 5 illustrates, diagrammatically, how the measuring system responsive to the current in and voltage across the circuit can be mounted on a live line stick for use by a line man.

Referring to FIG. 1 of the drawing, it will be observed that a system is there illustrated that can be employed for indicating the power factor of an alternating current circuit, such as a 60 cycle circuit, represented by the conductors 37 and 38. For this purpose a bridge 39 is employed with a non-linear current conducting device 40

2 in each of its branches. For example, a neon tube can be used since only a relatively small amount of current is to be drawn from the bridge 39. A potentiometer 41 is provided in each of the arms of the bridge 39 to permit individual adjustment for balancing purposes. The terminals 42 and 43 of the bridge 39 are connected to the conductors 38 and 37, respectively, and thus these terminals are energized with a fundamental frequency which is the frequency of the circuit represented by these conductors. A double frequency is applied to the terminals 44 and 45 of the bridge 39 through a capacitor 46 from the secondary winding 47 of a transformer, shown generally at 48, which has a primary winding 49 that is connected across the direct current terminals 50 and 51 of a rectifier bridge 52. The terminals 53 and 54 of the rectifier bridge 52 are connected for energization across a secondary winding 55 that is associated with the line conductor 38 and this conductor functions as a single turn primary winding. It will be understood that half cycles of the same polarity are applied to the primary winding 49 of the transformer 48 and that the output of the secondary winding 47 is an alternating current having a frequency of 120 cycles per second or double the fundamental frequency of circuit represented by the conductors 37 and 38. Where the current flow in the circuit represented by the conductors 37 and 38 is variable, it is desirable that a constant voltage be applied between the terminals 53 and 54 by the secondary winding 55. For this purpose zener diodes 55' can be connected, as shown, between these terminals and then function as a voltage limiter to maintain constant the voltage applied by the winding 55 regardless of changes in current flowing through the conductor 38. Where it is desired to obtain an indication of the power flow in the circuit represented by the conductors 37 and 38, the voltage limiter or diodes 55' are not used. Instead of using neon tubes 40 as non-linear resistance devices, Thyrite varistors can be used.

Across the terminals 44 and 45 of the bridge 39 a power factor indicator 56 is connected. In reality the power factor indicator 56 is a D'Arsonval type instrument, having substantial inductance, and is provided with a scale which has a zero center and is calibrated in degrees of power factor, leading and lagging as indicated. Since the power factor indicator 56 has substantial inductance, the flow of double frequency current therethrough is correspondingly limited. If desired, a 360° continuous rotation indicator can be substituted for the D'Arsonval indicator 56.

In the system shown in FIG. 1, the fundamental frequency, which is applied to the terminals 42 and 43 of the bridge 39, is derived as a function of the voltage across the conductors 37 and 38 while the second harmonic, which is applied across the terminals 44 and 45, is derived from the current flow in these conductors. It will be understood that these functions can be reversed and the fundamental frequency derived from the current flow in the conductors 37 and 38 and the second harmonic derived from the voltage therebetween.

In FIG. 2 of the drawing there is shown a modification of the power factor measuring system of FIG. 1. In this modification a null method of operation is employed and the rectifier bridge 52 is energized from the potential between the conductors 37 and 38. As before, the output of the rectifier bridge 52 is applied to the primary winding 49 of a transformer 48. In this instance the secondary winding 47 is connected to energize a phase shifter, shown generally at 57, which is capable of effecting a 360° phase shift and is described in more detail in application Serial No. 576,564, filed April 6, 1956. The phase shifter 57 includes capacitors 58 and linear resistors 59 connected in opposite arms of a bridge circuit which is energized, as shown in the drawing, from the secondary winding 47. A potentiometer resistor 60 is interconnected at diametrically opposite points to the four terminals of the bridge circuit and contact arms 61 are employed for engaging the same. Connection to the contact arms 61 is provided by slip rings 62 and it will be understood that the contact arms 61 are moved conjointly so that they always engage the potentiometer resistor 60 at locations 180° apart. The contact arms 61 are connected through a capacitor 63 to terminals 64 and 65 of a bridge circuit that is shown generally at 66. The bridge circuit 66 is made up of non-linear resistors 67. For example, they may be varistors, such as Thyrite formed of silicon carbide fused in clay. The terminals 68 and 69 of the bridge circuit 66 are connected across the secondary winding 55 which, as before, is inductively related to the conductor 38. In order to obtain a constant voltage the zener diodes 55' can be connected across the terminals of the secondary winding 55 to hold constant the voltage output thereof. A zero center galvanometer 70 is connected through an inductor 71 and between the terminals 64 and 65. The choke or inductor 71 is employed to reduce the ripple resulting from the alternating current at double frequency which is applied to the terminals 64 and 65 and thus limits or prevents the flow of alternating current through the galvanometer 70. It is a zero center device for indicating when the bridge 66 is in balance.

The bridge 66 is balanced by adjusting the position of the arms 61 along the potentiometer resistor 60 and relative to a scale 72 which can be calibrated, as indicated, from zero through 360°. It will be understood that the position of the arms 61 is adjusted until the pointer of the galvanometer 70 is in zero position. Then the reading on the scale 72 indicates the power factor of the circuit comprising the conductors 37 and 38 when the same are energized with alternating current.

When the null method is employed for measuring power factor and the bridge 66 is made up of resistors whose resistance increases with increase in temperature, the null indication is obtained when the fundamental and double frequencies are in phase. Such a resistor is one formed of tungsten and for this purpose a tungsten filament lamp can be used. When neon lamps are employed for the non-linear resistance devices, the resistance decreases with increase in current flow. Then the null indication is obtained when the current and voltage or the fundamental and second harmonic are 90° out of phase with each other.

FIG. 3 shows how a circuit arrangement illustrated in application Serial No. 708,187, filed January 10, 1958, can be employed for obtaining an indication of a variable characteristic of the alternating current circuit represented by the conductors 37 and 38. Here it will be observed that the secondary winding 47 of the transformer 48 is connected in series circuit relation with a secondary winding 73 of a potential transformer, indicated generally at 74, which has a primary winding 75 that is connected for energization across the conductors 37 and 38. The secondary windings 47 and 73 are connected in series circuit relation with a non-linear resistor 76, for example a Thyrite resistor, and through a linear resistor 77 or load device which may be the operating windings of the power factor meter 56 which, as described above, is a direct current measuring device of the D'Arsonval type. Alternatively, the power factor meter 56 can be connected in shunt circuit relation with the linear resistor or load device 77 to be operated by the voltage drop thereacross.

When the secondary winding 47 is energized with a frequency that is double the frequency of energization of the secondary winding 73 and the composite current formed by the fundamental frequency and the second harmonic flows through the non-linear resistor 76, a unidirectional current flows therethrough as a component of the total current flow. The magnitude and direction of flow of the direct current depends upon the relative magnitude and phase relationship between the fundamental and second harmonic currents from the secondary windings 73 and 47, respectively. Advantage is taken of this relationship to operate the power factor meter 56 for the purpose of indicating the phase relationship between the current and voltage in the circuit represented by the conductors 37 and 38.

As before, the voltage across the secondary winding 55 and applied to the terminals 53 and 54 of the rectifier bridge 52 is held constant by suitable means such as zener diodes 55'. Such a voltage limiter is omitted, as indicated hereinbefore, where it is desired to measure the power flow in the circuit represented by the conductors 37 and 38.

FIG. 4 shows how a watt meter 78 can be calibrated in watts. The watt meter 78 is in reality of the same construction as the power factor meter 56 except that its scale is calibrated in watts or in kilowatts or megawatts as may be desired. It will be observed that the watt meter 78 has a zero center scale and can be employed for indicating the direction in which the power flows in the circuit represented by the conductors 37 and 38.

In the systems illustrated in FIGS. 1, 2 and 3 the circuit including the circuit to the primary winding 49 includes a capacitor 49' with the arrangement being such that this circuit is tuned to resonate at twice the frequency, i.e., 60 cycles, of the circuit represented by the conductors 37 and 38 or 120 cycles.

It will be understood that the system employed for indicating the power factor of the circuit represented by the conductors 37 and 38 or the power flow therein can be incorporated in the electric measuring instrument shown in U. S. Patent No. 2,686,898, issued August 17, 1954, that is arranged to be mounted on a live line stick for manual manipulation by a line man. In such a case, instead of arranging to make a direct connection to both conductors 37 and 38 in order to provide an indication of the voltage therebetween, it can be assumed that one of them is grounded and connection then can be made to the other while a potential divider in the form of capacitors including the capacitance of the live line stick can be employed for making the connection to the other conductor in order to obtain a current flow which is a function of the line voltage.

FIG. 5 shows a system of the kind and character just described for mounting on a live line stick. Here it will be observed that the secondary winding 55 is mounted on a magnetic core 80 that can be positioned so as to enclose the conductor 38. As described hereinbefore, the secondary winding 55 is arranged to energize a rectifier bridge circuit 52 across which the primary winding 49 of the transformer 48 is connected for energization. Here a single zener diode 55' is employed across the terminals of the rectifier bridge 52 for voltage limiting purposes. The secondary winding 47 of the transformer 48 is connected across terminals 81 and 82 of a bridge circuit that is indicated, generally, at 83. The bridge circuit 83 includes in two of its arms non linear resistors 84 that may be of the Thyrite type. Interposed between the terminals 81 and 82 is a potentiometer 85 having an adjustable connection 86 which is connected to one terminal of the secondary winding 76. The power fatcor meter 56 is connected, as indicated, between the terminals 81 and 82 of the potentiometer 85. Another terminal 87 of the bridge circuit 83 is connected to the other terminal of the secondary winding 76. Zener diodes 55' are connected across the terminals of the secondary winding 76 for voltage limiting purposes.

One terminal of the primary winding 75 is connected through a capacitor 88 to a plate 89 that is juxtaposed to the line conductor 38. In this manner a current flow is obtained to the primary winding 75 which is derived from the voltage between the conductors 37 and 38. The remaining circuit will be described presently.

It will be observed that a broken line outline 90 encloses the circuit elements and circuit connections just described in FIG. 5. This apparatus is mounted in a suitable case, such as that shown in U. S. Patent No. 2,686,898, issued August 17, 1954, and is provided with a connector 91 for mounting on a live line stick to be manipulated by a line man. The remaining connection to the primary winding 75 of the potential transformer 74 is provided through a capacitor 92 which represents the capacitance of the live line stick and of the line man who is assumed to be standing on the ground indicated at 93. Also, it is assumed that the conductor 37 is grounded as indicated at 94. In order that variations in the capacitance of the capacitor have a minor effect on the voltage applied to the primary winding 75, the capacitance of the capacitor 88 is small as compared to the capacitance between the plate 89 and the conductor 38 and the capacitance of the capacitor 92. For example, the capacitor 88 may have 10% of the capacitance of the circuit between the conductor 38 and ground 93.

Since further changes can be made in the foregoing systems and different embodiments of the invention can be made without departing from the spirit and scope thereof, it is intended that all matter shown in the accompanying drawing and described hereinbefore shall be interpreted as illustrative and not in a limiting sense.

What is claimed as new is:

1. A system for measuring a variable characteristic of an alternating current circuit in which a fundamental frequency current flows comprising, in combination, two circuit means for individually connecting the system to be responsive to the current and voltage of said alternating current circuit, circuit means connected to one of said two circuit means for deriving a current flow that is a harmonic of the fundamental frequency, non-linear resistance means, circuit means interconnecting the other of said two circuit means and said circuit means providing the harmonic frequency with said non-linear resistance means to cause direct current to flow through said non-linear resistance means as a function of the relationship between the fundamental and harmonic frequency currents flowing through said non-linear resistance means, and means responsive to said direct current flow.

2. A system for measuring a variable characteristic of an alternating current circuit in which a fundamental frequency current flows comprising, in combination, two circuit means for individually connecting the system to be responsive to the current and voltage of said alternating current circuit, circuit means connected to one of said two circuit means for deriving a current flow that is a harmonic of the fundamental frequency, non-linear resistance means, circuit means inter-connecting the other of said two circuit means and said circuit means providing the harmonic frequency with said non-linear resistance means to cause direct current to flow through said non-linear resistance means as a function of the phase relationship between the current and voltage of said alternating current circuit, and means responsive to said direct current flow for indicating said phase relationship and thereby the power factor of said alternating current circuit.

3. A system for measuring a variable characteristic of an alternating current circuit in which a fundamental frequency current flows comprising, in combination, two circuit means for individually connecting the system to be responsive to the current and voltage of said alternating current circuit, circuit means connected to one of said two circuit means for deriving a current flow that is a harmonic of the fundamental frequency, non-linear resistance means, circuit means interconnecting the other of said two circuit means and said circuit means providing the harmonic frequency with said non-linear resistance means to cause direct current to flow through said non-linear resistance means as a function of the magnitude of and phase relationship between the current and voltage of said alternating current circuit, and means responsive to said direct current flow for indicating the power flow in said alternating current circuit.

4. A system for measuring a variable characteristic of an alternating current circuit in which a current of fundamental frequency flows comprising, in combination, two circuit means for individually connecting the system to be responsive to the current and voltage of said alternating current circuit, circuit means connected to one of said two circuit means for deriving a current flow that is double the fundamental frequency and including rectifier means and a transformer having a primary winding connected across said rectifier means and a secondary winding into which the double frequency current is induced, non-linear resistance means, circuit means interconnecting the other of said two circuit means and said secondary winding with said non-linear resistance means to cause direct current to flow through said non-linear resistance means as a function of the relationship between the fundamental and doubled frequency currents flowing through said non-linear resistance means, and means responsive to said direct current flow.

5. A system for measuring a variable characteristic of an alternating current circuit in which a current of fundamental frequency flows comprising, in combination, two circuit means for individually connecting the system to be responsive to the current and voltage of said alternating current circuit, circuit means connected to one of said two circuit means for deriving a current flow that is double the fundamental frequency and including rectifier means and a transformer having a primary winding connected across said rectifier means and a secondary winding into which the double frequency current is induced, non-linear resistance means, circuit means interconnecting the other of said two circuit means and said secondary winding with said non-linear resistance means to cause direct current to flow through said non-linear resistance means as a function of the phase relationship between the current and voltage of said alternating current circuit, and means responsive to said direct current flow for indicating said phase relationship and thereby the power factor of said alternating current circuit.

6. A system for measuring a variable characteristic of an alternating current circuit in which a current of fundamental frequency flows comprising, in combination, two circuit means for individually connecting the system to be responsive to the current and voltage of said alternating current circuit, circuit means connected to one of said two circuit means for deriving a current flow that is double the fundamental frequency and including rectifier means and a transformer having a primary winding connected across said rectifier means and a secondary winding into which the double frequency current is induced, non-linear resistance means, circuit means interconnecting the other of said two circuit means and said secondary winding with said non-linear resistance means to cause direct current to flow through said non-linear resistance means as a function of the magnitude of and phase relationship between the current and voltage of said alternating current circuit, and means responsive to said direct current flow for indicating the power flow in said alternating current circuit.

7. A system for measuring the power factor of an alternating current circuit comprising, in combination, two circuit means for individually connecting the system to be responsive to the current and voltage of said circuit, means connected to one of said circuit means for doubling the frequency of the current thereof; a four arm bridge circuit having in at least each of two adjacent arms a non-linear resistance device with one pair of opposite terminals connected for energization to the other of said circuit means and the other pair of opposite terminals, at least one of which is between said non-linear resistance devices, connected for energization to said frequency doubling means; and direct current responsive means connected between said other pair of opposite terminals.

8. The invention as set forth in claim 7 wherein the one pair of opposite terminals is connected to be energized in accordance with the voltage of the alternating current circuit and the other pair of opposite terminals is connected to be energized in accordance with the current flow in the alternating current circuit.

9. The invention as set forth in claim 7 wherein the frequency doubling means includes rectifying means and transformer means, the latter being energized with half cycles of the alternating current of the same polarity.

10. The invention as set forth in claim 7 wherein means are provided for shifting the phase of the current flow in one of said circuit means with respect to that of the other and the direct current responsive means is a null indicating means.

11. The invention as set forth in claim 7 wherein the one pair of opposite terminals is connected to be energized in accordance with the current flow in the alternating current circuit and the other pair of opposite terminals is connected to be energized in accordance with the voltage of the alternating current circuit.

12. A system for measuring a variable characteristic of an alternating current circuit in which a current of fundamental frequency flows comprising, in combination, two circuit means for individually connecting the system to be responsive to the current and voltage of said alternating current circuit, circuit means connected to one of said two circuit means for deriving a current flow that is double the fundamental frequency and including rectifier means and a transformer having a primary winding connected across said rectifier means and a secondary winding into which the double frequency current is induced, the other of said two circuit means including a transformer having a primary winding energized with said current of fundamental frequency and a secondary winding into which the same is induced, non-linear resistance means, circuit means interconnecting said secondary windings with said non-linear resistance means to cause direct current to flow through said non-linear resistance means as a function of the relationship between the fundamental and doubled frequency currents flowing through said non-linear resistance means, and means responsive to said direct current flow.

13. A system for measuring a variable characteristic of an alternating current circuit in which a current of fundamental frequency flows comprising, in combination, two circuit means for individually connecting the system to be responsive to the current and voltage of said alternating current circuit, circuit means connected to one of said two circuit means for deriving a current flow that is double the fundamental frequency and including rectifier means and a transformer having a primary winding connected across said rectifier means and a secondary winding into which the double frequency current is induced, the other of said two circuit means including a transformer having a primary winding energized with said current of fundamental frequency and a secondary winding into which the same is induced, non-linear resistance means, circuit means connecting said secondary windings in series circuit relation and in series circuit relation with said non-linear resistance means to cause direct current to flow through said non-linear resistance means as a function of the relationship between the fundamental and doubled frequency currents flowing through said non-linear resistance means, and means responsive to said direct current flow.

14. A system for measuring a variable characteristic of an alternating current circuit formed by a pair of conductors in which a current of fundamental frequency flows comprising, in combination, magnetic core means for positioning in inductive relation to one of said conductors having secondary winding means thereon into which alternating current is induced corresponding to the flow of alternating current in said conductor, rectifier means energized by said secondary winding means, transformer means having a primary winding means energized by said rectifier means and secondary winding means into which is induced an alternating current having a frequency double that of the fundamental frequency, potential transformer means having primary winding means capacitively connected for energization between said conductors and secondary winding means, non-linear resistance means, circuit means interconnecting said secondary winding means with said non-linear resistance means to cause direct current to flow through said non-linear resistance means as a function of the phase relationship between the fundamental and doubled frequency currents, and means responsive to said direct current flow.

15. A system for measuring a variable characteristic of an alternating current circuit formed by a pair of conductors in which a current of fundamental frequency flows comprising, in combination, magnetic core means for positioning in inductive relation to one of said conductors having secondary winding means thereon into which alternating current is induced corresponding to the flow of alternating current in said conductor, rectifier means energized by said secondary winding means, transformer means having primary winding means energized by said rectifier means and secondary winding means into which is induced an alternating current having a frequency double that of the fundamental frequency, potential transformer means having primary winding means capacitively connected for energization between said conductors and secondary winding means, non-linear resistance means, circuit means interconnecting said secondary winding means with said non-linear resistance means to cause direct current to flow through said non-linear resistance means as a function of the phase relationship between the fundamental and doubled frequency currents, means responsive to said direct current flow, and means for mounting the aforesaid means on a live line stick for manipulation by a line man.

16. A system for measuring a variable characteristic of an alternating current circuit formed by a pair of conductors in which a fundamental frequency current flows comprising, in combination, two circuit means for individually connecting the system to be responsive to the fundamental frequency current flow in and the voltage between said conductors, one of said circuit means being inductively related for energization to one of said conductors and the other of said circuit means being capacitively connected for energization between said conductors, circuit means connected to one of said two circuit means for deriving a current flow that is a harmonic of the fundamental frequency current, non-linear resistance means, circuit means interconnecting the one of said two circuit means from which the harmonic frequency current is not derived and said circuit means providing the harmonic frequency with said non-linear resistance means to cause direct current to flow through said non-linear resistance means as a function of the phase relation between the fundamental and harmonic frequency currents, and means responsive to said direct current flow.

17. A system for measuring a variable characteristic of an alternating current circuit formed by a pair of conductors in which a fundamental frequency current flows comprising, in combination, two circuit means for individually connecting the system to be responsive to the fundamental frequency current flow in and the voltage between said conductors, one of said circuit means being inductively related for energization to one of said conductors and the other of said circuit means being capacitively connected for energization between said conductors, circuit means connected to one of said two circuit means for deriving a current flow that is a harmonic of the fundamental frequency current, non-linear resistance means, circuit means interconnecting the one of said two circuit means from which the harmonic frequency current is not derived and said circuit means providing the harmonic frequency with said non-linear resistance means to cause direct current to flow through said non-linear resistance means as a function of the phase relation between the fundamental and harmonic frequency currents, and means responsive to said direct current flow, a live line stick, and means for mounting the aforesaid means on said live line stick for manipulation by a line man, a portion of the aforesaid capacitive connection being provided by said live line stick.

References Cited in the file of this patent

UNITED STATES PATENTS

| | | |
|---|---|---|
| 1,808,334 | Angus | June 2, 1931 |
| 1,919,284 | Walter | July 25, 1933 |
| 2,198,371 | Wolferz | Apr. 23, 1940 |
| 2,394,892 | Brown | Feb. 12, 1946 |
| 2,414,318 | Middel | Jan. 14, 1947 |
| 2,432,778 | Luck | Dec. 16, 1947 |
| 2,449,472 | Gulliksen | Sept. 14, 1948 |
| 2,512,495 | Gray | June 20, 1950 |
| 2,554,196 | Krause | May 22, 1951 |
| 2,585,707 | Warner | Feb. 12, 1952 |
| 2,756,376 | Davis et al. | July 24, 1956 |
| 2,927,270 | Wilton | Mar. 1, 1960 |

FOREIGN PATENTS

| | | |
|---|---|---|
| 712,643 | France | Oct. 6, 1931 |
| 631,991 | Great Britain | Nov. 14, 1949 |